A. R. LANG.
MOTOR VEHICLE.
APPLICATION FILED MAR. 15, 1920.
1,383,644. Patented July 5, 1921.
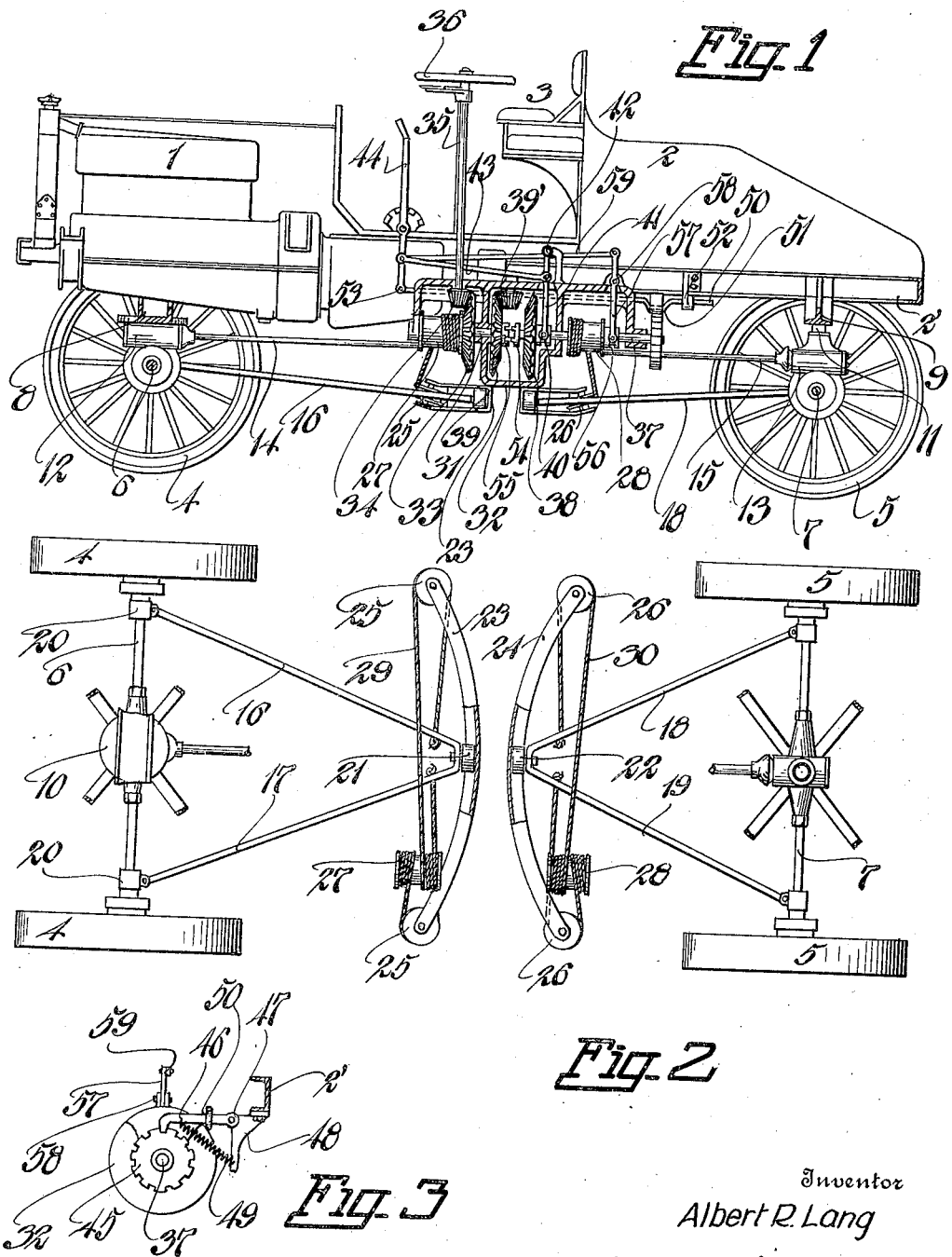
Inventor
Albert R. Lang
By Herbert E. Smith
Attorney

UNITED STATES PATENT OFFICE.

ALBERT R. LANG, OF SPOKANE, WASHINGTON, ASSIGNOR TO FLOOD MANUFACTURING COMPANY, OF SPOKANE, WASHINGTON, A CORPORATION.

MOTOR-VEHICLE.

1,383,644.  Specification of Letters Patent.  Patented July 5, 1921.

Application filed March 15, 1920. Serial No. 365,840.

*To all whom it may concern:*

Be it known that I, ALBERT R. LANG, a citizen of the United States, residing at Spokane, in Spokane county, and State of Washington, have invented certain new and useful Improvements in Motor-Vehicles, of which the following is a specification.

The present invention relates to improvements in motor-vehicles and particularly to the steering mechanism for the four wheel drive type of motor vehicles or motor trucks, the primary object of the invention being the provision of facile means whereby the front and rear axles and their wheels may be turned for guiding or steering the vehicle.

The invention contemplates the utilization of both the front and rear axles and wheels in steering; the use of the front wheels only; and such use of both the front and rear wheels when applied to a tractor machine for hill side plowing, for instance, where it is necessary and desirable at times to turn the front and rear wheels in opposite directions in order to maintain the implement in position to travel in a straight line. To attain these ends the invention consists in certain novel combinations and arrangements of parts operated from a steering wheel and post, and controlled by suitable mechanisms, as will be hereinafter set forth and claimed.

In the accompanying drawings I have illustrated one complete example of the physical embodiment of my invention constructed and arranged according to the best mode I have so far devised for the practical application of the principles of my invention, but it will be understood that changes and alterations may be made therein without departing from the spirit of my invention.

Figure 1 is a view in side elevation of an automobile truck or motor vehicle embodying my invention, parts being shown in section for convenience of illustration, and the mechanism adjusted in order that the steering is accomplished by the front wheels only, the rear wheels remaining in the same relative position, but of course utilized for driving the vehicle.

Fig. 2 is a plan view of the under rigging or framing of the steering apparatus for the two sets of wheels.

Fig. 3 is a detail view of the device for holding the rear wheels inoperative as steering wheels.

In the preferred form of the invention as illustrated in the drawings I have utilized an automobile of the four-wheel drive type, and in the general assembly view of Fig. 1 the motor of the automobile is indicated by the numeral 1, the body as 2 and the chassis of frame as 2', the usual form of seat being shown at 3, while other parts are illustrated to give a general idea of the construction and arrangement of parts.

The front steering wheels 4, 4, and the rear steering wheels 5, 5, may also be utilized for drive wheels, the former being journaled on the front axle shaft 6 and the rear wheels being journaled on the rear axle shaft 7, a front bolster 8 and a rear bolster shaft 9 being utilized in connection with the front and rear swivel connections 10 and 11 respectively, whereby the axles may be turned, as the vehicle is steered, with relation to the body or chassis of the vehicle.

The driving mechanism for the vehicle includes worm gearing, as inclosed in the worm cases 12 and 13 at the front and rear respectively, and the longitudinally disposed propeller shafts 14 and 15 transmit power to the gearing, axles and wheels from the motor 1, as set forth in a co-pending application of my invention.

In equipping the motor vehicle with my invention I utilize two pairs of reach rods as 16 and 17 and 18 and 19, the pairs being formed as integral members and of V-shape having their divergent ends coupled to attaching sleeves as 20 on the axle shafts 6 and 7 at the front and rear of the vehicle. At the apex of the pairs of reach rods, which lie in horizontal planes with their apices at the approximate longitudinal center of the vehicle and along the axis of the vehicle, are provided a pair of anti-friction rollers 21 22 respectively, and these reach rods, through the rollers, are supported in complementary intermediate bolsters 23 and 24. These intermediate bolsters extend transversely of the vehicle, below the chassis, and are preferably made of channel iron of proper strength and size, and extend in the line of an arc of a circle, with the swivel point at the front and rear axles as their respective centers. The arcuate bolsters are properly supported, and immovable, and at their ends are fashioned with forks in which the horizontally disposed grooved pulleys or sheaves 25 and 26 are journaled, each bolster having a pair of pulleys as shown in Fig. 2.

From this description it will be apparent that the respective reach rods and axles form front and rear, triangular frames with the inner, adjoining, ends of these triangular frames supported on their bolsters, and power applied at the apex of either or both frames will cause the axles and their wheels to swivel beneath their bolsters for steering or guiding the vehicle. While the rollers might be free to travel outwardly toward either end of the arcuate bolster, the movement of course is limited, but such movement as is necessary is guided and stabilized by the flanges of the angle iron or channel iron intermediate bolsters which confine the rollers 21 and 22.

For steering the vehicle the reach rod frames are pulled laterally of the vehicle through the instrumentality of revoluble drums 27 and 28 located beneath the chassis or frame and in operative position with relation to the reach rod frames, and each drum has a cable as 29, 30 wound with several turns about the drum and extending around the respective grooved pulleys, with the ends of the cable in each case attached at opposite points on the reach rods as seen in Fig. 2. Thus it will be apparent that when the drums are rotated or revolved, the reach frame will be pulled laterally by one or the other of the attached cable ends, to swing the axles on their swivel joints.

The forward steering drum 27 is rigidly fixed on a longitudinally extending steering shaft 31 journaled in a frame 32 suspended from the chassis of the vehicle, and a bevel gear wheel 33 is attached to or forms a part of the steering drum 27 and rotates therewith and with the shaft 31. The drum is revolved through its bevel gear by means of the pinion 34 on the lower end of the steering post 35 and the steering wheel 36 of usual form is utilized to manipulate the parts. From this description it will be apparent that the front triangular frame, composed of the front axle and reach rods, may be horizontally oscillated on the front swivel connection of the vehicle, through the instrumentality of the steering wheel, the gear connection, the drum and cable and the connection of the cable 29 with the front triangular reach frame, the parts being arranged as in Fig. 1 for this purpose.

As before stated the vehicle may be steered, solely by the front steering wheels, which are also driving wheels, or if required or desired the rear driving wheels may be coupled with the front wheel steering mechanism, and the rear wheels steered through the rear triangular reach frame and its drum and cable 28 and 30.

The rear drum 28 is fixed to revolve with its shaft 37, the latter being journaled in the gear frame 32 and adapted to slide therein. The shaft 37 is alined with the front shaft 31 and carries a large bevel gear 38 slidable on the shaft and through which the shaft itself may be slid. The alined steering shaft 31 also carries a bevel gear 39, fixed thereon and complementary to the large bevel gear 38, and between these bevel gears is interposed a bevel pinion 39' journaled in the supporting frame. The slide or shiftable gear 38 may be moved into mesh with the pinion 39', which latter is at all times in mesh with the bevel gear 39, by means of the clutch sleeve 40, clutch yoke 41 pivoted at 42 in the supporting frame, the link 43 and the lever 44. Thus it will be apparent that when the lever 44 is pushed to the right in Fig. 2 the gear wheel 38 will be shifted on its shaft 37 to engage the bevel pinion 39' and when this operation is completed not only will the front axle and wheels be moved as the steering wheel 36 is turned, but in addition and through the train of gears 39, 39' and 38, the shaft 37 and drum 28 will be revolved to swing the rear reach frame. The interposition of the bevel pinion between the two bevel gears results in an opposite movement of the front and rear axles 6 and 7 and the truck or vehicle is thus steered or guided to turn as required.

When the rear wheels are not to be used for steering purposes they are held against oscillation, through the reach frame and its connections, by means of a rack or toothed wheel 45 on the shaft 37, at the rear end of the shaft. This rack wheel is engaged, as best seen in Fig. 3, by a pawl or ratchet 46 pivoted at 47 on a bracket 48 of the frame or chassis 2' of the vehicle, and a spring 49 between the pawl and bracket is under tension to hold the pawl and rack wheel in engagement. The pawl holds the rack wheel against rotation, and of course the wheel holds the shaft 37 and its drum, the cable and reach frame against lateral movement, thus preventing oscillation of the rear axle on its swivel joint.

To release the pawl and permit the rear axle to be oscillated, a draw rod or slide rod 50, provided with a cam face 51, is slidably supported in bearings 52 above the shaft 37 and parallel therewith, and at 53 this draw rod is pivoted to the operating lever 44 for throwing into operation the rear steering wheels, and it will readily be seen that the same movement of the lever 44 that couples the bevel gears 38 and 39, also releases the pawl from the rack wheel by action of the cam portion 51 of the slide bar or shaft 50.

In some instances it is desirable that the two reach frames be pulled in opposite lateral directions, instead of in the same lateral direction as usual, to swing the front and rear axles, as for example so that the front wheels will be steered to the left and the rear wheels to the right. This movement is sometimes necessary when the steering mechanism is employed on a tractor hauling a plow or other agricultural implement on a hill side to maintain the proper direction of travel, and is accomplished as above set forth.

In the usual and customary steering by both front and rear wheels and axles, however, I utilize a clutch member 54 on the shaft 37, at its end adjacent the steering shaft 31, and on the latter shaft a complementary clutch member 55 is carried or it may be an integral part of the bevel gear 39. To engage these two clutch members the sleeve 56 on the drum shaft 37 is employed in connection with the clutch yoke 57 pivoted at 58, in the supporting frame or chassis of the vehicle, and a draw rod 59 connects the yoke arm with an operating lever as 44. The drum 28 and clutch sleeve 56 are fixed on the shaft 37, and it will be apparent that when the suspended yoke 57 is swung, to the left in Fig. 1 through the action of its draw rod 59, the shaft will be shifted in its bearings, longitudinally, causing the engagement of the two clutch members 54 and 55, and due to this engagement, the alined steering, shafts 31 and 37 are coupled to revolve in the same direction, instead of in reverse directions as when coupled by the pinion 39′. In consequence of the rotation of the coupled shafts the drums 27 and 28 are revolved in the same direction, causing the rollers 21 and 22 to travel, laterally in the same direction as the reach frames swing to the right and left.

From the above description taken in connection with the drawings it is evident that I have provided a steering means for a four-wheel-drive or two-wheel-drive motor vehicle and capable of operation in such manner as to turn the front and rear wheels in opposite directions for the purpose described, and by the utilization of my invention a facile and simple mechanism is developed, for carrying out the purposes of my invention.

Having thus fully described my invention, what I claim is—

1. The combination with the front and rear swiveled axles of a vehicle, of a pair of V-shape reach frames having their divergent arms attached thereto as described, a pair of oppositely disposed arcuate bolsters and an anti-friction roller at the apex of each frame guided by said bolsters as described, means for laterally moving both frames to guide the vehicle, and means for holding one frame for the purpose described.

2. The combination with the oscillatable reach frames, guides therefor and winding drums and cables operatively connected thereto, of a steering device including a drive pinion, a pair of alined shafts supporting said drums and a gear on one shaft engaging said pinion, means for holding the other shaft against rotation, and means for coupling said shafts, for the purpose described.

3. The combination with the front and rear swiveled axles of a vehicle, of a pair of V-shape reach frames having their divergent arms attached thereto, a pair of oppositely disposed arcuate bolsters and an anti-friction roller at the apex of each frame guided by said bolsters, a steering device including a driving pinion, a pair of alined shafts and drums thereon, operative cables on the drums, a gear on one shaft engaging said pinion and said cables operatively connected to said frames, and means for holding one frame for the purpose described.

4. The combination in a motor vehicle including an axle shaft and wheels, of a V-shape reach frame connected to the axle and provided with an anti-friction roller at its apex, a swivel connection for the axle, a transverse fixed bolster of arcuate form forming a path of movement for said roller, a steering wheel, post and pinion, a drum having a bevel gear actuated by said pinion, and a cable wound upon said drum having its opposite ends attached to said frame.

5. The combination with oscillatable reach frames and guides therefor and winding drums and cables operatively connected thereto, of a steering device including a drive pinion, a pair of alined shafts supporting said drums and a gear on one shaft engaging said pinion, a rack on the other shaft, a spring pressed ratchet co-acting therewith, means for releasing said ratchet, and a clutch and operating means for coupling said shafts.

In testimony whereof I affix my signature.

ALBERT R. LANG.